Jan. 7, 1941.　　　D. H. McCORKLE　　　2,227,732
THERMALLY CONTROLLED ELECTRIC SWITCH
Filed Nov. 22, 1938　　　3 Sheets-Sheet 1

Inventor
Donald H. McCorkle
By Philip A. Friedell
Attorney

Jan. 7, 1941.  D. H. McCORKLE  2,227,732
THERMALLY CONTROLLED ELECTRIC SWITCH
Filed Nov. 22, 1938  3 Sheets-Sheet 2
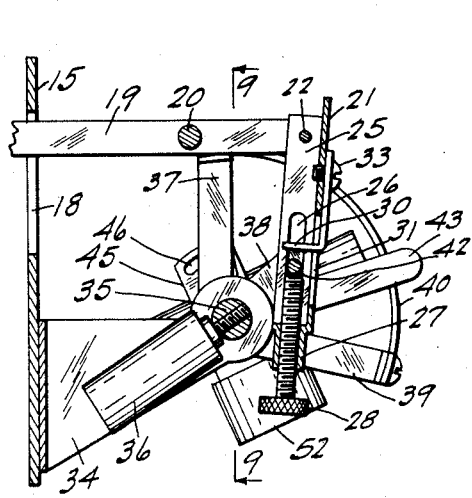
Fig. 4.
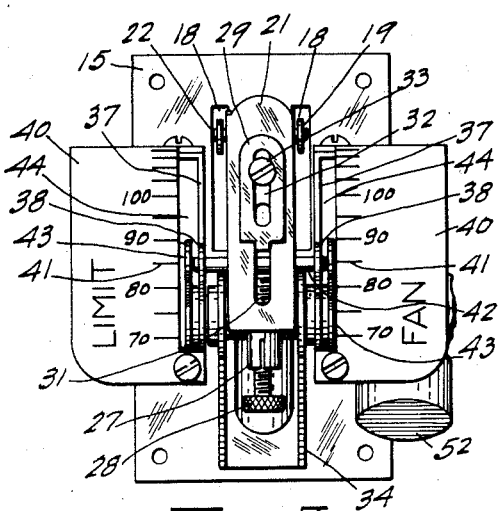
Fig. 3.
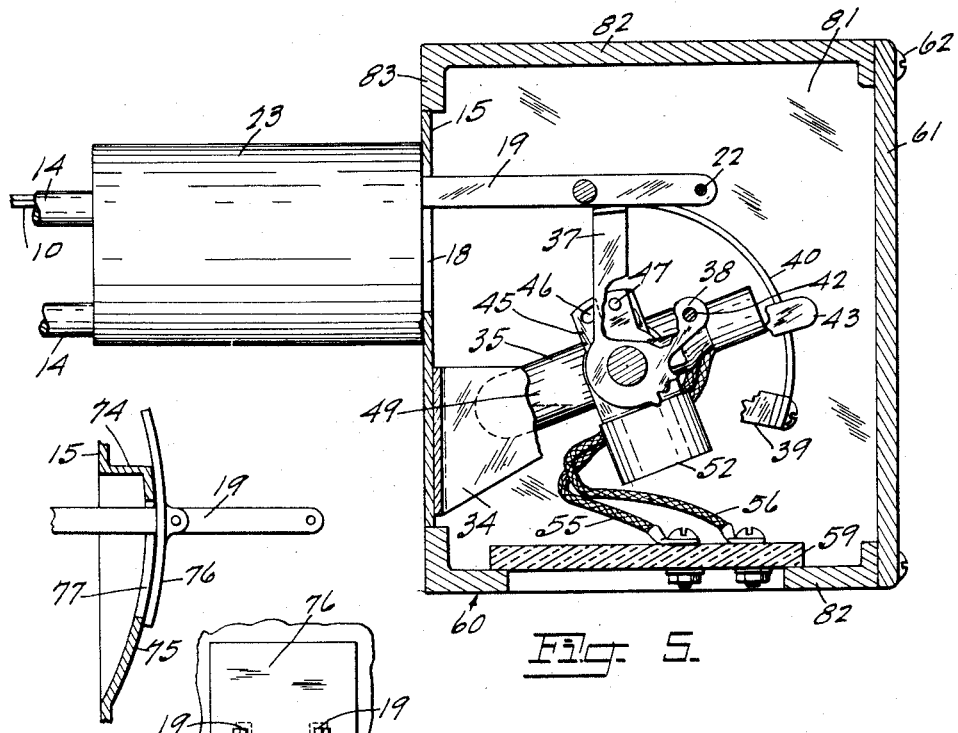
Fig. 5.
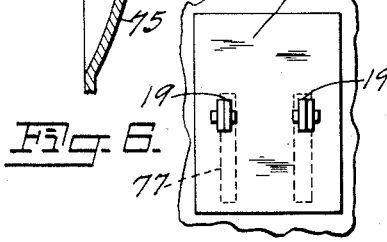
Fig. 6.
Fig. 7.
Inventor
Donald H. McCorkle
By Philip A. Friedell
Attorney Jan. 7, 1941.　　　D. H. McCORKLE　　　2,227,732
THERMALLY CONTROLLED ELECTRIC SWITCH
Filed Nov. 22, 1938　　　3 Sheets-Sheet 3
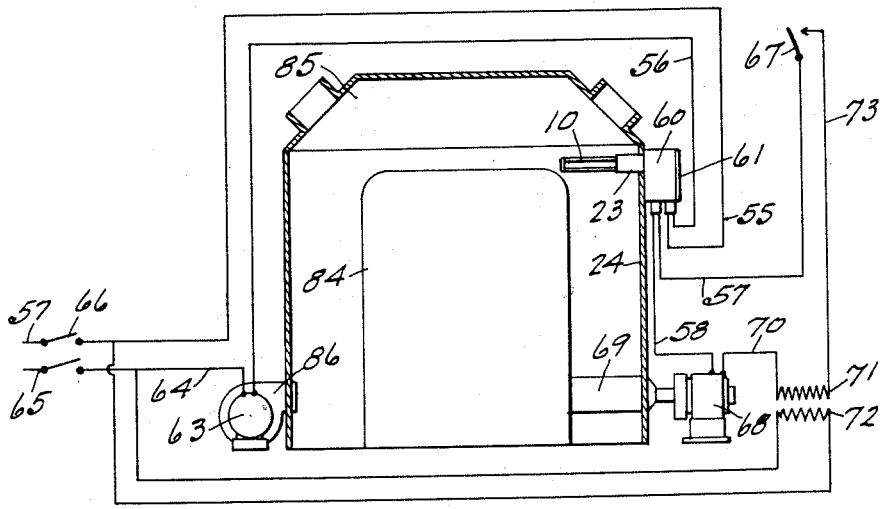
Fig. 8.
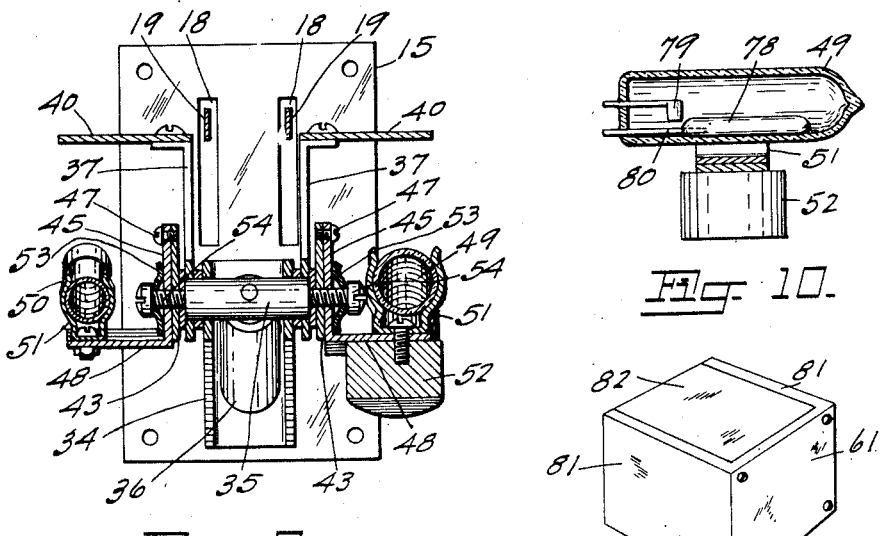
Fig. 9.
Fig. 10.
Fig. 11.
Inventor
Donald H. McCorkle
By Philip A. Friedell
Attorney Patented Jan. 7, 1941

2,227,732

UNITED STATES PATENT OFFICE 2,227,732

THERMALLY CONTROLLED ELECTRIC SWITCH

Donald H. McCorkle, Berkeley, Calif.

Application November 22, 1938, Serial No. 241,808

11 Claims. (Cl. 200—138)

This invention, a thermally controlled switch, is particularly designed for the secondary control of furnaces; for completely controlling operation of the blower or fan while secondarily controlling operation of the burner; the usual room thermostat forming the primary control for the burner.

Heretofore, switches of related characteristics, have been actuated through the medium of twisting, torsional, rotating and winding types of thermally-responsive elements, some operating through shafts or other torsional or twisting type members. Spiral, helical, and similar constructions of thermally-responsive elements all have an inherent tendency to operate spasmodically or jerkily and therefore are not uniform and reliable in their operation, especially as to slight variations in temperature. The bearings required for shafts and other torsional or twisting elements become encrusted with dust, and the heat drives off any lubricant used other than that combined with the dust to cause encrustation, and the friction created thereby further reduces the sensitivity and accuracy of the instrument.

It is to overcome these disadvantages that this invention utilizes a thermally-responsive element in the form of a cantilever beam having its anchor end rigidly supported, and with the beam entirely free from all bearings or frictional contacts within the direct heat zone, and with the mechanism operated thereby formed as near frictionless as possible, to establish sensitivity and accuracy at a maximum.

The objects and advantages of this invention are as follows:

First; to provide a thermally-actuated control in which the actuating element consists of a member subjected through temperature changes, to flexing action only, and which, being maintained free of all torsional stresses, and free of bearing or other frictional contacts within the direct heat zone, will assure the greatest degree of sensitivity and accuracy in its responsiveness to temperature changes.

Second; to provide a control as outlined in which the switch carrying devices with their associated switches, are counterbalanced in a neutral position of the switches only, whereby a delay switching period is assured without the introduction of friction or friction elements, and in which the switches will tend to overbalance to full closed or full open position as soon as the devices have passed their neutral position through the urgence of the thermally responsive element.

Third; to provide means for adjusting the delay period in terms of temperature variation, at will.

Fourth; to provide means for adjusting the switches for actuation at predetermined temperatures at will.

Fifth; to provide adjusting means for compensating for variations in the plane of mounting of said control relative to a predetermined plane, whereby angularity of the mounted control may be compensated for by direct adjustment of the switch carrying mechanism for the purpose of coordinating the existent temperature with the temperature scale of the control.

Sixth; to provide a control as outlined in which friction is reduced throughout to an absolute minimum, whereby maximum accuracy and sensitivity is attained and the switches become suddenly responsive in either direction from the position of balance.

Seventh; to provide a control which is actuated through the medium of a cantilever beam incorporating in its length a single strip of bimetal, and which beam is free of all frictional contacts other than that of its terminal pivotal end connection to the switch carrier connecting means.

In describing the invention, reference will be had to the accompanying drawings, of which:

Fig. 3 is a front end elevation showing the arcuate dials, and the adjusting devices, and the connection between the actuating beam and the tiltable switch carrier.

Fig. 4 is a section taken on line 4—4 of Fig. 1.

Fig. 5 is a section taken on line 5—5 of Fig. 1, showing portions broken away to illustrate interior construction, and including the housing in section.

Fig. 6 is a modification showing a frictionless seal for the beam-arm slots.

Fig. 7 is a front elevation of Fig. 6.

Fig. 8 is a wiring diagram of the invention as applied to a furnace.

Fig. 9 is a section taken on line 9—9 of Fig. 4.

Fig. 10 illustrates the neutral position of a switch and the position of balance as related to the tiltable carrier.

Fig. 11 is a perspective view of a preferred form of housing for the control.

Figure 1:
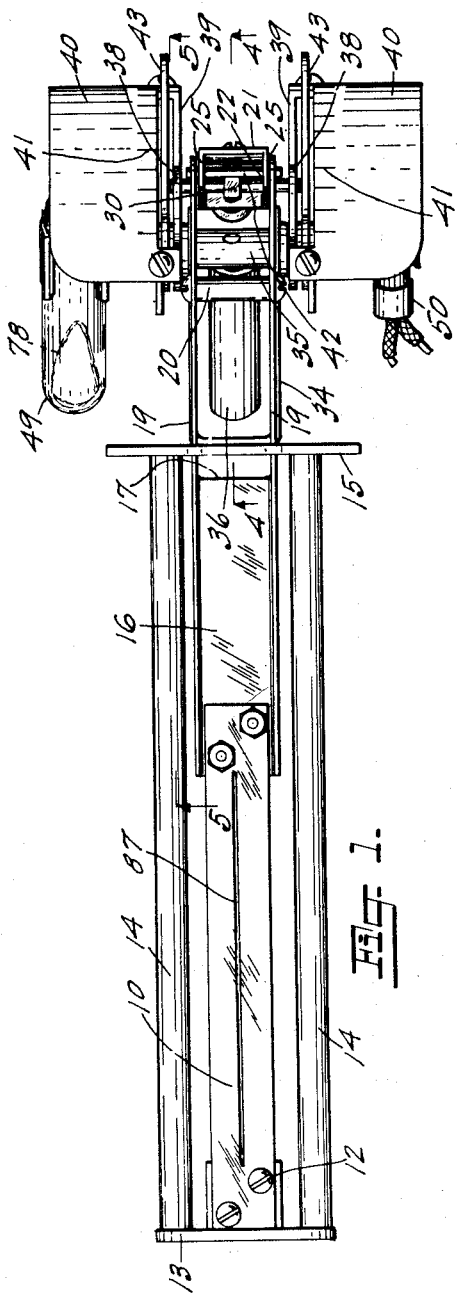
Fig. 1 is a plan view of the invention with the guard sleeve and housing removed.
Figure 2:
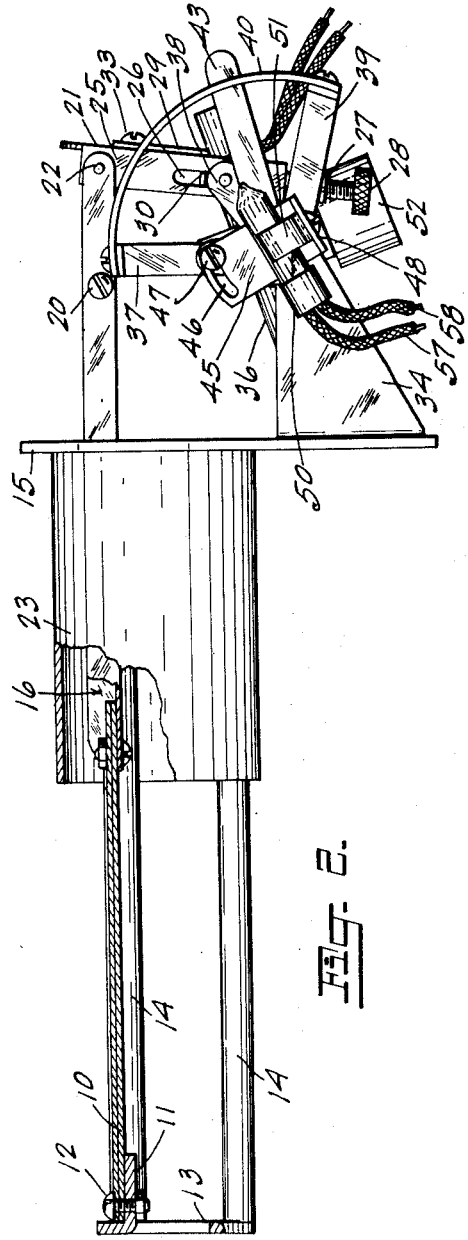
Fig. 2 is a side elevation of Fig. 1, with the guard sleeve included, and with a portion of the invention shown in section.

One of the most important elements of the invention is the cantilever beam type thermally-responsive element, which is entirely devoid of bearings or frictional contacts within the direct heat zone of the furnace, and therefore undeterred in its responsiveness to temperature changes, and free from any tendency toward jerky or intermittent response, as has been found to exist inherently in twisting, torsional, spiral and helical types, plural bimetal strip types, and others than this cantilever beam type.

These usual types of thermally-responsive elements usually actuate a rotatable shaft or other rotatable or twistable member, or some type of reciprocating or sliding member, all of which require bearings or slideways within the direct heat zone of the furnace, thus introducing friction, further decreasing the uniformity, sensitivity and accuracy of response to temperature changes.

This specific cantilever beam type actuator and the method employed of operatively connecting it to the switching and indicating mechanism, permits the introduction and simultaneous operation of a plurality of switches, and in which the indicators or dials and the adjusting mechanisms are all frontally accessible, as will be further described.

The thermally-responsive member, or actuating beam, is shown as consisting of a single strip of bimetal 10, which has one terminal end anchored to a support 11, as by means of screws 12; this support 11 being formed integral with the end plate 13, which in turn is rigidly supported by the rods 14 to one end of which the end plate is fixedly secured, the other ends of the rods being fixedly secured to the head 15 by known means.

The bimetal 10 may be used to form the complete actuating beam, however, a shorter length like that shown, will usually answer the purpose. The beam is made to the desired length to provide necessary travel of the free end, by forming an extension 16 of ordinary rigid metal or other rigid material, that shown being formed to channel shape and being fixedly attached by one of its ends to the free terminal end of the bimetal strip 10, as shown.

For the purpose of maintaining minimum area of passages through the head 15 for passage and deflection of the beam, the web of the channel is removed back to a point 17, and two vertical slots 18 are formed in the head 15 to clear the extending flanges 19 which form arms, the slots amply clearing the arms to permit their unrestricted and frictionless movement through the head 15.

The arms 19 are fixedly spaced by means of a spacer 20, and the operating head or connection 21 is pivotally suspended from the terminal ends of the arms 19 as indicated at 22, ample clearance being provided between the arms 19 and the sides of the connection 21 to minimize friction to that introduced by the small pivot 22; therefore the actuating means may be conceded to be substantially frictionless.

The responsive, or insertible section of the control consisting of the elements 10 to 14, is provided with a cylindrical sleeve 23, which is affixed to the head 15, to assure non-interference with the beam, where the section passes through the walls 24 of the furnace casing.

The operating head 21 is also in the form of a channel, the pivot 22 passing through the flanges 25, and each of the flanges has an elongated slot 26 formed therein, and the lower end of the head is flanged in and provided with a friction nut 27 in which the adjusting screw for adjusting the lag or delay period, is frictionally held.

Adjustably mounted on the web 21 of the operating head is another adjustable device consisting of a slidably adjustable element 29 which has an inturned finger 30 which projects through an elongated slot 31 formed in the web 21 of the operating head. This element 29 has an elongated slot 32 to permit vertical adjustment of the finger 29, and it is secured in adjusted position by means of the screw 33 which is threadedly secured in the web 21.

A bracket 34 is fixedly secured to the head 15 by known means and forms the mounting means and support for the indicating and switch mechanism, and a rotatable shaft 35 is supported by this bracket, and a counterweight 36 is associated with this shaft 35.

Fixedly secured on each end of the shaft 35 is a spider having each three arms 37, 38 and 39, and an arcuate dial 40 is mounted on the outbent terminal ends of each pair of arms 37, 39, and supported thereby, each of the dials being graduated in values of temperature as indicated at 41, and all dials face frontally for direct observation. These spiders may be secured by pressing on the shaft, or by other known means. A pin 42 passes through the slots 26 in the flanges 25 of the operating head and between the finger 30 and upper end of screw 28. This pin also forms a spacer between, and is supported by the arms 38 of the spiders.

Mounted on each end of the shaft 35 is an adjusting and indicating lever 43 which projects radially beyond the dial 40 and passes through the slot 44 formed in the inner edge of the dial.

An adjusting arm and switch support 45 cooperates directly with each indicating lever 43, and is provided with an arcuate slot 46 through which the arm is adjustably secured to the lever 43 by means of a screw 47, and the arm is bent out to form a step support 48 for the mercury switch, as 49 and 50, and a suitable clip 51 is provided on each step support for the respective switches.

A counterweight 52 is secured to the step support and dependently mounted to independently produce a stabilizing effect on the switch when the switch is in its neutral position, being otherwise termed herein as being on an even keel.

A friction element 53 cooperates facially with the arm 45, and an assembly of friction element 53, arm 45 with its step support, and lever 43, are connected to each end of the shaft 35 by means of a screw 54 which creates the frictional resistance necessary to retain the lever 43 in any adjusted position; the screw itself being locked by the friction element, and the friction element introducing no friction into the tiltable assembly.

The switch 49 is the fan or blower control switch, and is provided with the leads 55 and 56; and the limit switch 50 is provided with the leads 57 and 58, which leads are all anchored to a terminal insulating plate 59 which is mounted in the housing 60 in which the switch mechanism and switches are housed, this housing being provided with a removable front cover 61 which is secured in place by means of the screws 62.

The wiring diagram indicates one method of installation, and shows the actuating element 10 extending into the furnace casing and the housing 60 attached to the outside of the furnace wall.

The leads 55, 56, of the switch 49 respectively connect to the supply line 57 and one terminal of the fan or blower motor 63, while the other terminal of this motor is connected through conductor 64 to the other side 65 of the supply line, the current supply being controlled by a switch 66.

The leads 57 and 58 of the limit switch 50, respectively connect to the room thermostat 67 and one terminal of the burner control 68 which controls operation of the burner 69 through the room thermostat 67 under normal conditions, the other terminal of the burner control being connected through a conductor 70 to one side of the secondary 71 of a transformer whose primary is connected to the line 57—65 through switch 66 as indicated, the secondary 71 having its other side connected to the room thermostat 67 by means of the conductor 73.

Although it has not been found necessary, the passages 18 through the head 15 through which the arms 19 project, may be modified for sealing against ingress of dust and gases as indicated in Figs. 6 and 7, in which the head 15 has a projecting portion 74 having an arcuate face 75 corresponding to the arc of travel of the related portion of the arms 19, and an arcuate curtain 76 is affixed to the arms to cover the slots 77, this curtain operating very close, but not in actual contact with the arcuate face 75, thus still obviating friction while sealing the housing from the gases, heat and dust from the interior of the furnace casing; the object in all cases being to maintain the cantilever beam free of all frictional contacts or friction introducing factors.

The installation and primary adjustment is carried out by forming a hole in the wall 24 of the furnace casing, inserting the heat responsive portion of the control through the hole, and fastening the control in position to the outside of the furnace casing wall, as indicated in Fig. 8.

The adjusting levers 43 are next moved to coincide with the graduations on the respective dials agreeing with the existent temperature within the furnace casing, after which the support screws 47 are eased and the switch supports adjusted until the mercury 78 is in its neutral position as indicated in Fig. 10, with the mercury just on the verge of completing circuit between the electrodes 79 and 80, after which the screws are tightened. This compensates for any variation from true vertical of the portion of the furnace casing on which the control is mounted.

If desired, the side walls 81 of the housing may be formed integral with the cover 61, in which case the adjustment just recited may be facilitated. Other adjustments are all accessible from the front through removal of the cover 61.

A housing of this type is illustrated perspectively in Fig. 11, in which the front wall 61 and side walls 81 form a channel-shaped cover, and the top and bottom 82 and rear wall 83 (Fig. 5) form a channel-shaped body. With this arrangement the control is directly installable and completely accessible.

After the installation is completed and the electrical conections made, it is merely necessary to adjust the levers 43 to the temperatures respectively, at which the fan is to start operating, and at which the burner 69 is to be shut down, respectively, on the "Fan" and "Limit" dials.

This adjustment tilts the mercury switches backwardly as shown in Fig. 5, completing circuit through the limit switch 50, and leaving the circuit through the fan switch 49 open; the higher the temperature adjustment, the greater the tilt, and consequently the greater the deflection required of the beam to change the circuit conditions.

The finger 30 is adjusted to just contact the pin 42, and the screw 28 is adjusted toward or away from the pin according to the differential or delay period desired, and through which range of temperature the switches are to maintain the instant conditions of the circuit.

The operation of the invention as as follows: As the room thermostat closes, a circuit is completed through wire 73, transformer secondary 71, wire 70, to the burner control 68, thence through lead 58, switch 50, lead 57 to the thermostat 67, starting operation of the burner and combustion within the furnace 84.

The furnace heats the air within the casing 85, and the heated air acting on the thermally-responsive element 10, deflects the cantilever beam 10, 16, 19, which lowers the head 21, which through finger 30 acting on pin 42 tilts the tiltable device including spiders and switches forwardly.

As soon as the switch 49 has attained the position shown in Fig. 10 and is urged slightly beyond, due to the fact that the friction inherent in the tiltable device assembly is very low and that the assembly is fully balanced with the exception of the mercury 78, the mercury creates an overbalanced condition and urges the assembly to rotate on its own initiative until restrained by the screw 28, thus making quick and efficient connection between the electrodes 79 and 80, completing circuit to the blower motor 63, which drives the blower 86, forcing air through the furnace casing, and thus effecting cooling which affects the thermally-responsive element 10, causing it to retract and start moving the tiltable device in a circuit-breaking direction. However, the switch 49 will not be opened until the lag period, defined by the spacing between the finger 30 and screw 28 has been exceeded, during which time the furnace will have increased its heat output sufficiently to start deflection of the beam again.

Thus, the blower is kept in operation in spite of the drop in temperature created upon starting and during initial operation. The beam will now continue to deflect as the heat increases, increasing the tilt of the tiltable device, which tends to follow the head 21 during deflection until the weight 52, due to its angularity from its normally suspended position, overcomes the overbalancing weight of the mercury, after which the tiltable device will remain motionless until the finger 30 again reaches the pin, further deflection of the beam then overcoming the counterweight and increasing the tilt. Upon retraction of the beam, the tiltable device will follow the pin until the point just stated has been reached, when it will remain motionless until the screw 28 reaches the pin.

In case that the heat in the furnace casing should rise to the value to which the limit switch is set, the beam will have tilted the switch 50 sufficiently to break the circuit between leads 57 and 58, breaking the circuit to the burner control 68, shutting off the burner, and while the blower continues to operate, and after sufficient cooling within the furnace casing, retraction of the beam again completes the circuit through switch 50, again starting operation of the burner, unless, in the meantime the room temperature should have risen sufficiently to open the switch of the room thermostat 67, under which conditions the blower will operate until the beam has again returned to the proper position for breaking the circuit through switch 50. Thus heating is maintained definitely within prescribed limits. As will be noted, no friction element is introduced to effect the differential or delay period, and the counterweight 52 becomes effective following a predetermined degree of tilt of the switch, in either direction. The switch is balanced when it is in its neutral position, and also at a predetermined angle of tilt in either direction. This is due to the shift of the center of gravity of the combination of switch, counterweight, and support. This counterweight is applied to the heaviest of the switches, and may be additionally provided for the other switches, which should preferably be more closely balanced than the main switch so as not to interfere with the normal overbalancing of the main switch.

When no counterweights are provided for the remaining switches, the counterweight 36 is so proportioned as to balance all of the tiltable mechanism together with these remaining switches.

In connection with the thermally-responsive element 10, it will be understood that in the event of considerable width being required in this element, that either several narrow strips will be used, or the wide strip will be slit lengthwise as indicated at 87 in Fig. 1, so as to avoid deleterious transverse flexure and assure uniform operation of the element.

It will also be understood that variations in construction and arrangement of parts, which variations are consistent with the appended claims, may be resorted to without detracting from the spirit or scope of the invention, or sacrificing any of the advantages thereof.

I claim:

1. A furnace control comprising a cantilever beam formed of a flat single strip of thermally-responsive material; a rigid support within the furnace and having one end of said beam rigidly affixed thereto with the other end projecting through a passage formed through the wall of the furnace; a pivotally mounted and balanced tiltable assembly mounted exteriorly of the furnace; a plurality of mercury-switch supports mounted on said assembly and a mercury switch mounted in each support; and slack connecting means connecting the free end of said beam and said tiltable assembly, said slack connecting means cooperating positively with said tiltable assembly only after a predetermined flexure of said strip of thermally-responsive material has been created; said mercury switches creating an overbalanced condition of said assembly and influenced by the mercury in the switches for quick making and breaking of circuits; and, in which said connecting means includes adjustable means for adjusting the delay period between reverse operations of the switches; and counterweight means associated with the larger one of the switches balancing the switch in a horizontal position and in two angular positions respectively circuit opening and circuit closing, only, and being overcome by the weight of the mercury when the switch is changed slightly in either direction from said horizontal position, and thus effecting change of switch conditions without further control by said beam for definite and prompt action.

2. A furnace control comprising a cantilever beam formed of a flat single strip of thermally-responsive material; a rigid support within the furnace and having one end of said beam rigidly affixed thereto with the other end projecting through a passage formed through the wall of the furnace; a pivotally mounted and balanced tiltable assembly mounted exteriorly of the furnace; a plurality of mercury-switch supports mounted on said assembly and a mercury switch mounted in each support; and slack connecting means connecting the free end of said beam and said tiltable assembly, said slack connecting means cooperating positively with said tiltable assembly only after a predetermined flexure of said strip of thermally-responsive material has been created; said mercury switches creating an overbalanced condition of said assembly and influenced by the mercury in the switches for quick making and breaking of circuits; and, in which said tiltable assembly is balanced with the exception of the mercury contained in one of said mercury switches and which establishes a balance in only the horizontal position and circuit making and circuit breaking positions of said switch and creates a condition of imbalance when the switch is urged by said beam slightly in either direction from said horizontal position, whereby the mercury creates through its weight a definite tilting shift of the tiltable assembly and quick and positive operation of the switch independently of said beam after said horizontal position has been exceeded.

3. A furnace control comprising a cantilever beam formed of a flat single strip of thermally-responsive material; a rigid support within the furnace and having one end of said beam rigidly affixed thereto with the other end projecting through a passage formed through the wall of the furnace; a pivotally mounted and balanced tiltable assembly mounted exteriorly of the furnace; a plurality of mercury-switch supports mounted on said assembly and a mercury switch mounted in each support; and slack connecting means connecting the free end of said beam and said tiltable assembly, said slack connecting means cooperating positively with said tiltable assembly only after a predetermined flexure of said strip of thermally-responsive material has been created; said mercury switches creating an overbalanced condition of said assembly and influenced by the mercury in the switches for quick making and breaking of circuits; and, in which said tiltable assembly consists of a plurality of spiders rigidly connected and tilting on the same axis at right angles to the longitudinal axis of the beam; a combined adjusting and indicating lever associated with each spider; said mercury switch supports being adjustably secured to the respective levers, and being, with the associated lever, frictionally controlled and retained in adjusted position.

4. A furnace control comprising a cantilever beam formed of a flat single strip of thermally-responsive material; a rigid support within the furnace and having one end of said beam rigidly affixed thereto with the other end projecting through a passage formed through the wall of the furnace; a pivotally mounted and balanced tiltable assembly mounted exteriorly of the furnace; a plurality of mercury-switch supports mounted on said assembly and a mercury switch mounted in each support; and slack connecting means connecting the free end of said beam and said tiltable assembly, said slack connecting means cooperating positively with said tiltable assembly only after a predetermined flexure of said strip of thermally-responsive material has been created; said mercury switches creating an overbalanced condition of said assembly and influenced by the mercury in the switches for quick making and breaking of circuits; and, in which said tiltable assembly is provided with a plurality of frontally-facing arcuate dials operating in the same plane and graduated in temperature values, for direct frontal observation; a lever cooperatively related to each dial and associated with the support for the related mercury switch for adjusting the switch at will for changing circuit characteristics under conditions of temperature indicated by the relation of the lever to the dial; and in which said connecting means includes adjustable means for adjusting the delay period between reverse operations of the switches; and counterweight means associated with one of the switches balancing the switch only in a horizontal position and in two angular positions respectively circuit making and circuit breaking, and being overcome by the weight of the mercury when the switch is moved slightly beyond the horizontal position in either direction, permitting sudden and positive operation of the switch through the overbalancing action of the mercury as it flows to the leading end of the mercury switch.

5. A furnace control comprising a cantilever beam formed of a flat single strip of thermally-responsive material; a rigid support within the furnace and having one end of said beam rigidly affixed thereto with the other end projecting through a passage formed through the wall of the furnace; a pivotally mounted and balanced tiltable assembly mounted exteriorly of the furnace; a plurality of mercury-switch supports mounted on said assembly and a mercury switch mounted in each support; and slack connecting means connecting the free end of said beam and said tiltable assembly, said slack connecting means cooperating positively with said tiltable assembly only after a predetermined flexure of said strip of thermally-responsive material has been created; said mercury switches creating an overbalanced condition of said assembly and influenced by the mercury in the switches for quick making and breaking of circuits; and, in which said tiltable assembly is provided with a plurality of frontally-facing arcuate dials operating in the same plane and graduated in values of temperature; a lever cooperatively related to each dial and associated with the support for the related mercury switch for adjusting the switch at will for changing the circuit characteristics under conditions of temperature indicated by the relation of the lever to the dial; and in which said tiltable assembly is balanced with the exception of the mercury contained in one of said mercury switches and which establishes balance in only the horizontal position and in two angular positions respectively circuit making and circuit breaking positions of said switch and creates a condition of imbalance when the switch is urged by said beam toward one of said angular positions, whereby the mercury creates through its weight by shifting in its container a definite tilting shift of the tiltable assembly, and the effort of tilt for the beam is maintained at a minimum and the switches are actuated when urged beyond the horizontal position solely through the overbalancing effect of said mercury.

6. In combination, a tiltable device having a pivot and adapted to tilt in either direction; a mercury switch having contacts and an uninterrupted bottom wall to permit free flow of mercury from one end to the other of said switch and mounted on said tiltable device above said pivot; a rigid support; a flat thermo-responsive strip selected for maximum sensitivity and accuracy and having one end affixed to said support; an operative connection between said tiltable device and the other end of said strip and having play means permitting predetermined free movement of said tiltable device relative to said strip, whereby when said strip is flexed in either direction under the influence of changes in temperature, the strip will move the tiltable device to a position just past the even-keel position of the mercury switch and the mercury switch will upon reaching the said position move through the balance of its circuit changing position through the influence of gravity created by the overbalanced condition as the mercury within the switch flows to the leading end of the tube, thus creating sudden change of circuit in the switch.

7. A structure as claimed in claim 6 in which adjusting means is included in said play means and adjustable to limit the amount of play at will.

8. A structure as claimed in claim 6 in which a counterweight is associated with said tiltable device and balances said device only when said mercury switch is on an even keel and in a predetermined position beyond said even keel position in each direction of movement and being overbalanced by the mercury contained in the switch in positions between the even keel position and each of said predetermined positions.

9. A thermally controlled switch comprising; a rigid support; a flat, thermo-responsive strip having one end affixed to said support and the other end free to flex; a tiltable device having a pivot, and a mercury switch mounted on said tiltable device in a position above said pivot; said tiltable device and its associated switch being balanced only when the mercury in said switch is on an even keel, said mercury otherwise creating a condition of imbalance and gravitationally acting to move the tiltable device in the direction of imbalance; and an operative connection between the other end of said thermo-responsive strip and said tiltable device and including means introducing play and permitting movement of said tiltable device relative to said other end to a predetermined degree whereby, when said thermo-responsive strip moves said tiltable device to a position just beyond the even keel position of the mercury switch, the mercury in the switch will suddenly move the tiltable device and its associated mercury switch to said predetermined degree to full circuit-changing position.

10. In a switch mechanism having a thermally-responsive actuator; a rotatable element mounted on a horizontal axis; a mercury switch mounted on said element with its axis at right angles to the axis of the rotatable element and radially spaced therefrom; a counterweight mounted on said rotatable element and balancing said rotatable element when said mercury switch is located above the axis of said rotatable element with its axis in a horizontal plane and also balancing said rotatable element when said mercury switch is in either of two angular positions in which the switch respectively makes and breaks circuit, the mercury in the switch creating an overbalance in any position intermediate said horizontal and angular positions; and a slack connection between said actuator and said rotatable element restricting actuation to terminal movements of the actuator and freeing the rotatable element for actuation through the overbalancing effect of the mercury.

11. In a thermally-operated switch; a rotatable support mounted on a horizontal axis; a thermo-flexible strip anchored at one end and having a slack connection between its other end and said rotatable support for actuating said support only after said strip has been flexed through thermal influences to a predetermined degree and thus creating a delay period; a mercury switch mounted with its axis transverse to the axis of said rotatable support; and a counterweight mounted on said rotatable support and balancing said support in any one of three positions in one of which the switch axis is horizontal and the mercury therein is on an even keel, and in two angular positions in which the mercury switch is respectively in circuit making and circuit breaking positions; the mercury in said switch creating an overbalanced condition of the rotatable support in all intermediate positions between the horizontal and the angular for self operation to either circuit making or circuit breaking position after said slack connection through the influence of said thermo-flexible strip has moved said switch just past the even keel position of the mercury switch; said slack connection actuating said support only during terminal flexing of said strip and being otherwise devoid of control thereover.

DONALD H. McCORKLE.